Jan. 26, 1960

T. B. BODIMER ET AL 2,922,509

MOBILE BELT LOADER

Filed Jan. 27, 1958

INVENTORS:
THEODORE B. BODIMER
AUGUSTINE A. PITROLO

BY *Charles F. Ogard*

ATTORNEY

INVENTORS:
THEODORE B. BODIMER
AUGUSTINE A. PITROLO
BY Charles F. Osgood,
ATTORNEY

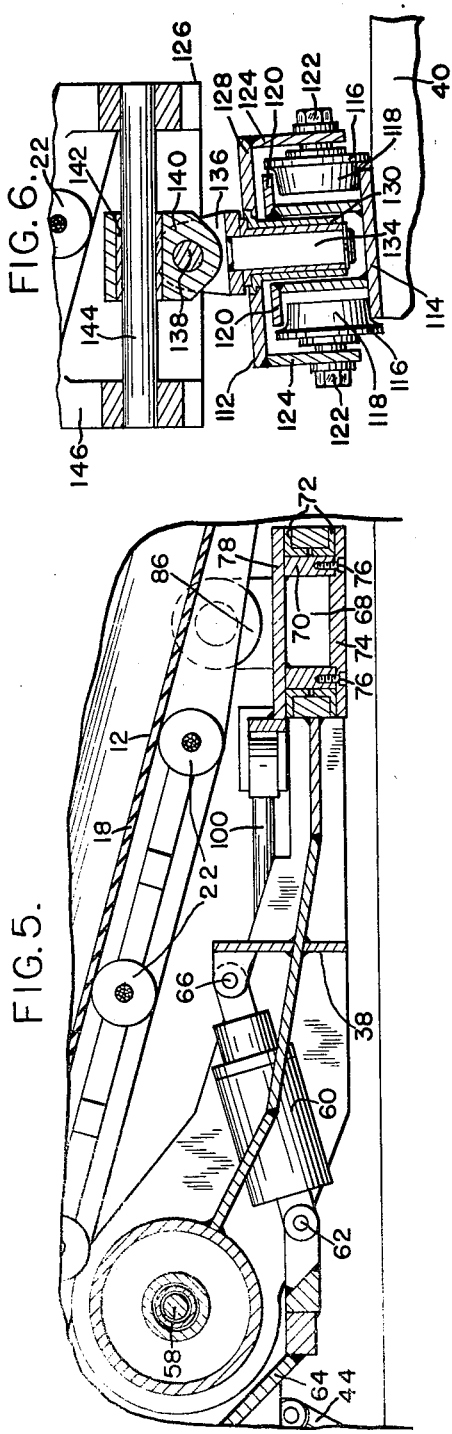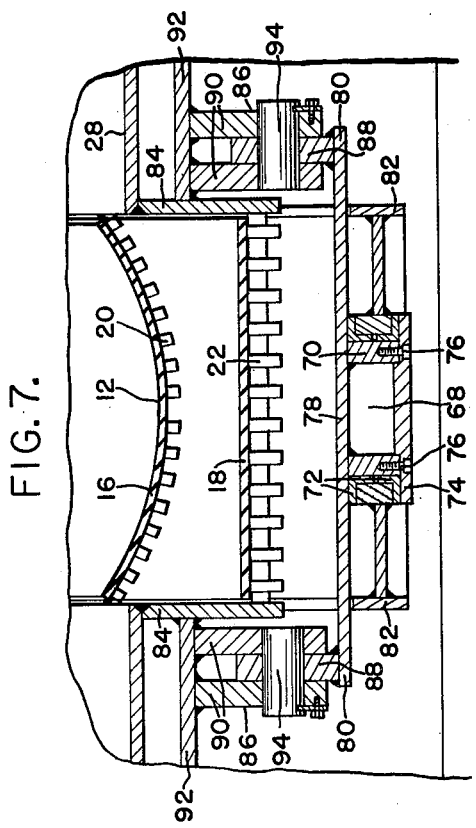

Jan. 26, 1960 T. B. BODIMER ET AL 2,922,509
MOBILE BELT LOADER
Filed Jan. 27, 1958 4 Sheets-Sheet 4
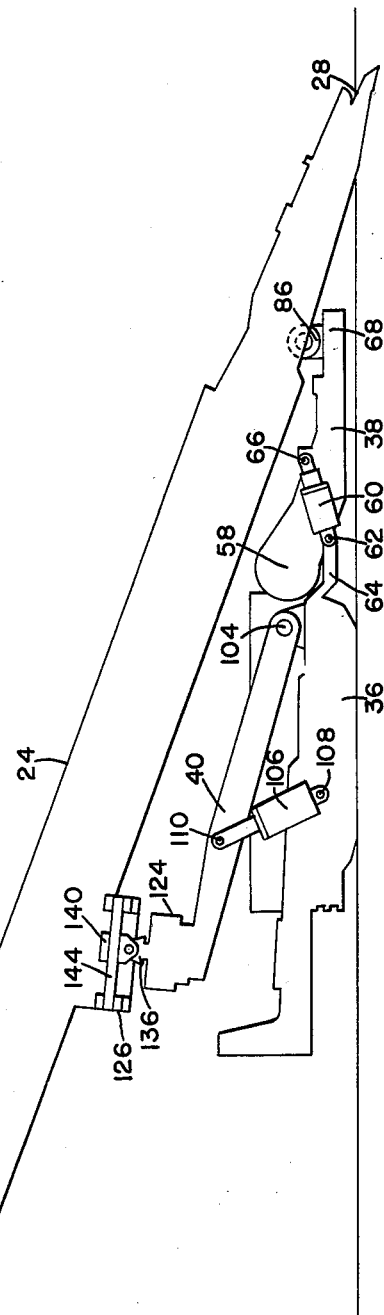
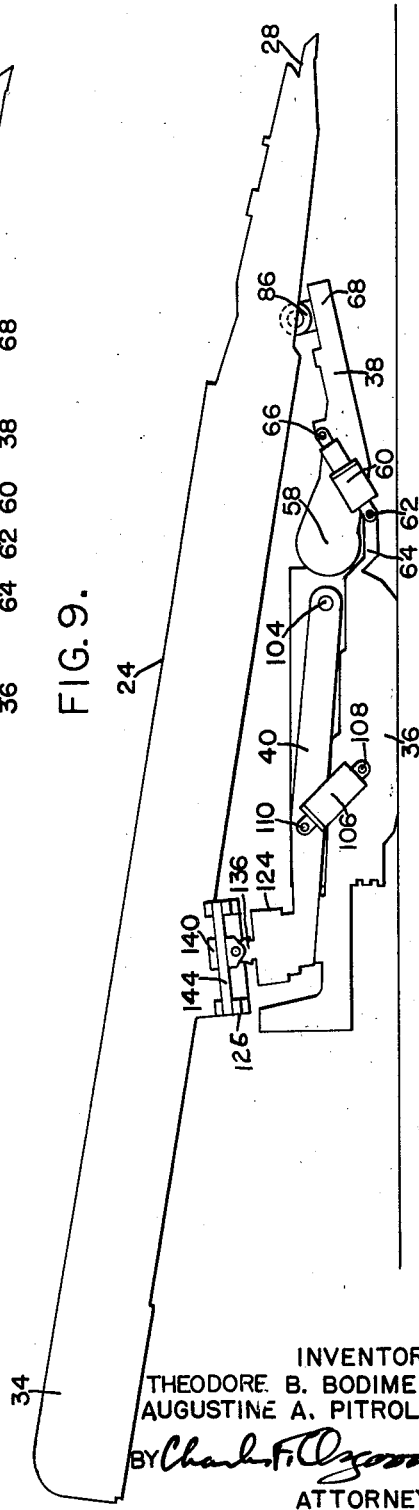
INVENTORS:
THEODORE B. BODIMER
AUGUSTINE A. PITROLO
BY Charles F. Osgood
ATTORNEY United States Patent Office 2,922,509
Patented Jan. 26, 1960

2,922,509

MOBILE BELT LOADER

Theodore B. Bodimer, Franklin, Pa., and Augustine A. Pitrolo, Cincinnati, Ohio, assignors to Joy Manufacturing Company, Pittsburgh, Pa., a corporation of Pennsylvania Application January 27, 1958, Serial No. 711,257

20 Claims. (Cl. 198—10)

This invention relates to mobile loaders and more particularly to an integral continuous belt loader and gathering head with the gathering head at the forward end thereof and with the loader mounted on a movable base by means which provides for vertical and lateral pivoted conveyor adjustments and for conveyor slope adjustment.

Loading of heavy, hard and abrasive materials presents many troublesome problems which are difficult if not impossible for most mineral loading devices. Practice has shown that belt conveyors have excellent handling capabilities for conveying heavy abrasive rocks of all types from place to place. It should follow that if an endless belt conveyor were properly adapted for use as part of a loader many of the loading problems encountered with heavy hard abrasive rocks would be overcome.

It is therefore a major object of the present invention to provide an improved mobile loader with a continuous belt conveyor which extends into a gathering mechanism at its forward end.

Another object of this invention is to provide the means for a range of lateral pivoted, vertical and conveyor slope adjustments of an integral endless conveyor and gathering head structure in a mobile loader.

A still further object is to provide a movable base for an integral continuous belt conveyor and gathering head structure.

Further objects and advantages will appear from the following description and claims when read in conjunction with the attached drawings, wherein:

Figure 5 is a section view taken along line 5—5 of Figure 3 showing lateral pivoting means for the continuous belt conveyor with an integral gathering head.

Figure 6 is a section view taken along line 6—6 of Figure 3 illustrating transverse movement rail support means for the tail portion of the continuous belt loader.

Figure 7 is a section view taken along line 7—7 of Figure 2 showing lateral pivot means and conveyor belt detail.

Figure 8 is a side elevation view of our improved continuous belt loader with the continuous belt conveyor and integral gathering head adjusted to a tail high steep slope loading state.

Figure 9 is a side elevation view showing the continuous belt conveyor and integral gathering head adjusted to a slight slope with the integral gathering head spaced from the floor.

Figure 1:
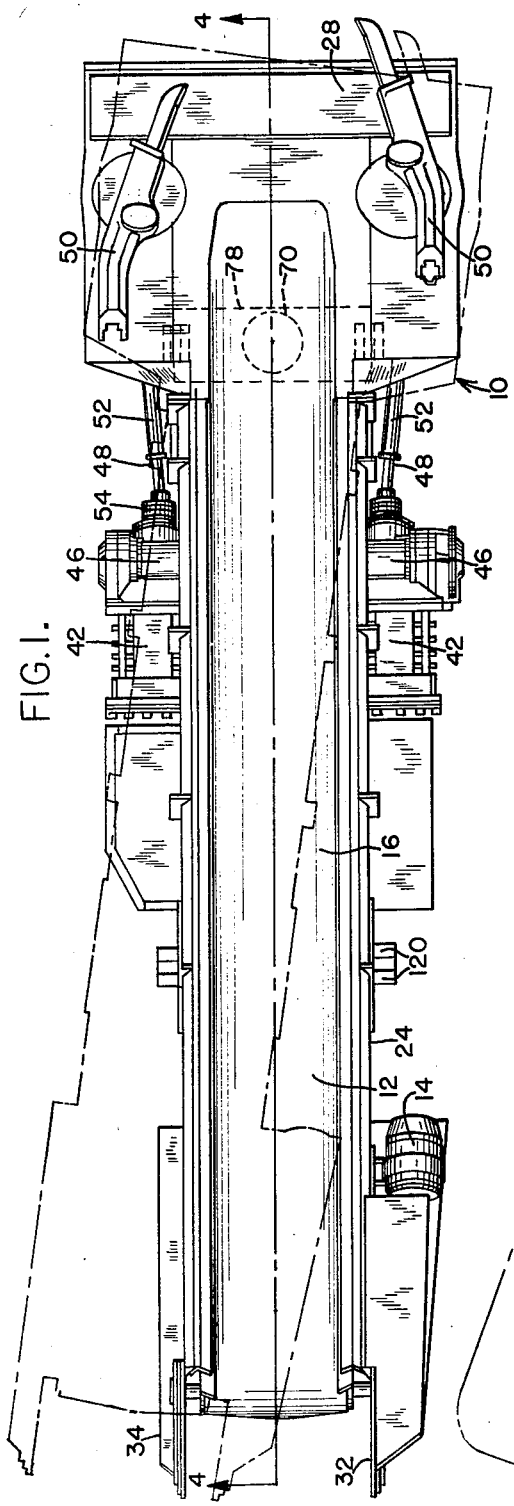
Figure 1 is a plan view of our improved continuous belt loader with an integral gathering head mounted on a mobile base.

In our improved mobile continuous belt loader 10 shown, endless belt 12 is driven by motor 14 through an orbit with an upper conveyor run 16 and a lower return run 18 supported by idlers 20 and 22 respectively, within conveyor frame structure 24. Endless belt 12 extends from belt turn means 26 within material gathering head 28, which is an integral front part of the conveyor frame structure 24, to belt turn means 30 at the material dumping end 32 of the loader conveyor frame tail 34. Conveyor frame structure 24 of loader 10 with its integral material gathering head 28 is supported on mobile base 36 by a front structural frame unit 38 and by a rear structural frame unit 40.

Mobile base 36 is shown to have drive motors 42 each of which may be drivingly connected, as desired, to either or both its respective parallel endless tread means 44 through the respective transmission 46 and the drive train 48 for the respective gathering head arm 50. The drive train 48 for each gathering head arm 50 includes a splined drive shaft line 52 which readily adapts to different drive shaft lengths between the respective universal drive joints 54 and 56. Universal drive joints 54 and 56 are provided along with the splined drive shaft lines 52 in order that drive trains 48 will flexibly adapt to any vertical or lateral pivoted position of material gathering head 28.

Front forwardly extended boom-like structural frame unit 38 is mounted on the mobile base 36 for pivotal movement upward and downward about pivot means 58. Fluid power cylinders 60 are pivotally mounted at 62 at one end to the frame structure 64 of mobile base 36 and at the other end pivotally connected at 66 to front structural frame unit 38 in order to regulate the pivoted height position of the front lateral pivot portion 68 of front structural frame unit 38 as desired. Fluid power cylinders 60 regulate the heighth of the material gathering head 28 and of conveyor frame structure 24 through a range of positions from the position shown in Figure 2 to such positions as the position indicated in phantom and the positions shown in Figures 8 and 9.

Referring also to Figures 5 and 7 pivot means 70 is axially restrained in place for rotation within the bearing inserts 72 by bottom plate 74, which is fixed to pivot means 70 by bolts 76, and by cross plate 78 which is fixed to the top of pivot means 70 as by welding. Cross plate 78 extends transversely across frame unit 38 with ends 80 projecting beyond the sides 82 of frame unit 68 and beyond sides 84 of conveyor frame structure 24. Pivot pin structures 86 have upright members 88 fixed as by welding to ends 80 of cross plate 78 and members 90 fixed as by welding to frame 92 of material gathering head 28. Pivot pins 94 form the pivotal connection between upright members 88 and respective members 90.

Conveyor frame structure 24 with its integral material gathering head 28 is supported by the front lateral pivot portion 68 of front structural frame unit 38 through pivot means 70, cross plate 78, and pivot pin structures 86 which permit pivoting slope adjustment of the integral conveyor frame structure 24 about the transverse axis of pivot pins 94.

Figure 3:
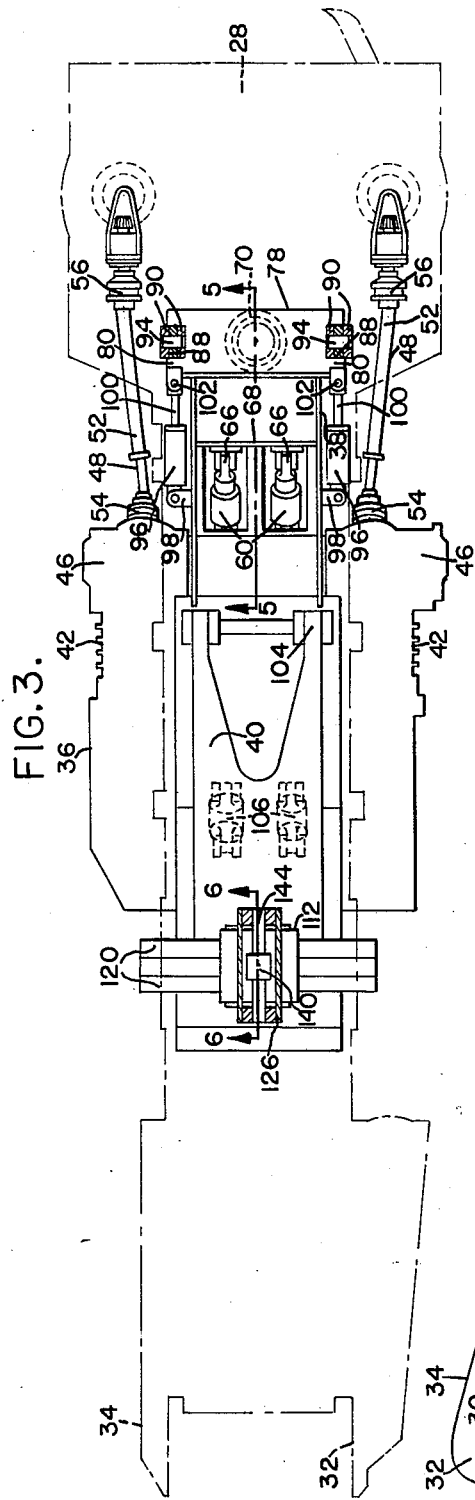
Figure 3 is a partial sectioned plan view taken along line 3—3 of Figure 2 showing gathering head drive detail and continuous belt mounting detail on a mobile base.
Figure 4:
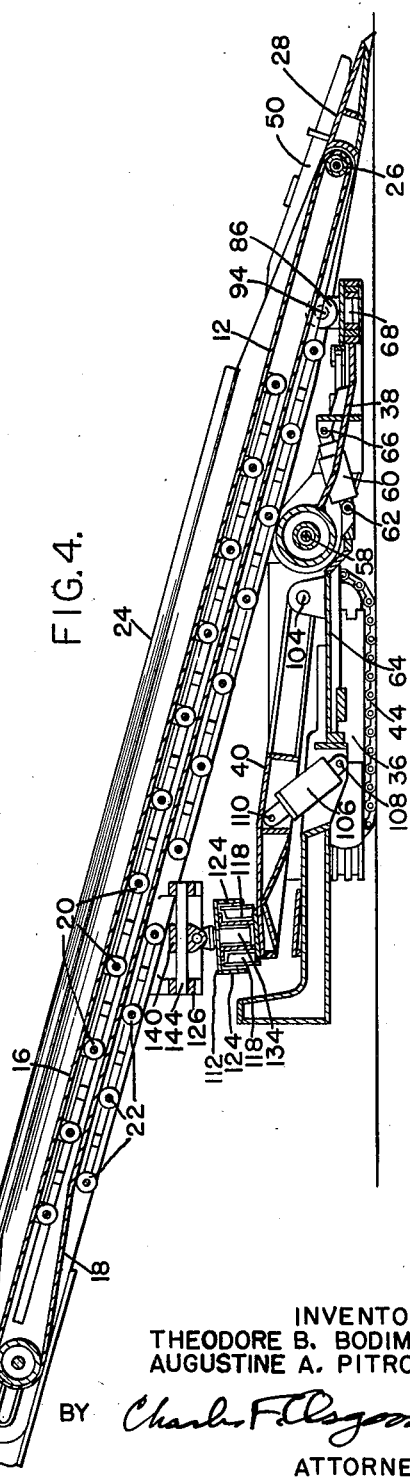
Figure 4 is a cut away and sectioned view taken along line 4—4 of Figure 1 showing continuous belt conveyor and mobile base detail.

Referring to Figures 3 and 5 fluid power cylinders 96 are pivotally mounted by respective pivot bracket means 98 to respective sides of front structural frame unit 38. Output rods 100 of respective fluid power cylinders 96 are pivotally connected at 102 to respective ends 80 of cross plate 78. This is the means for controlled pivoting of cross plate 78 and of conveyor frame structure 24 about pivot means 70 for lateral movement of conveyor tail 34 and material gathering head 28 through a range of positions from the position shown in Figure 1 to positions such as the position indicated in phantom.

A rear boom-like structural frame unit 40 which extends rearwardly from pivot means 104 is supported on mobile base 36 for pivotal movement upward and downward about the pivot means 104 the pivotal axis of which is parallel to, closely adjacent and behind pivot means 58 of front structural frame unit 38. Fluid power cylinders 106 are pivotally mounted 108 at one end to frame structure 64 of mobile base 36 and at the other end pivotally connected 110 to rear structural frame unit 40 in order to regulate the pivoted height position of transverse rail guide means 112 which is mounted to and extends transversely across the extreme end of rear structural frame unit 40.

Referring also to Figure 6 rail guide means 112 has bottom rail portions 114 for the tracking therealong of respective flanged 116 rail wheels 118. Rail guide flanges 120 of rail guide means 112 limit movement of rail wheels 118 from the respective bottom rail portions 114. Rail wheels 118 are inwardly mounted by mounting means 122 from respective side brackets 124 of rail wheel carriage 126. Cross plate 128 of rail wheel carriage 126 is provided with downwardly depending pivot bearing sleeve 130 which projects downward between rail guide flanges 120 to further limit movement of rail wheels 118 from rail guide means 112. Bearing insert 132 is a journal bearing insert in pivot bearing sleeve 130 for downwardly depending pivot pin 134. Pivot pin 134 is fixed as by welding to pivot pin rail carriage support bracket 136. Bracket 136 has a pivot pin 138 connection with longitudinally movable bracket 140. Bracket 140 is equipped with bearing insert 142 for free movement back and forth beneath conveyor frame structure 24 along and limited pivoting about rod 144 which is mounted in bracket means 146 of conveyor frame structure 24.

Figure 2:
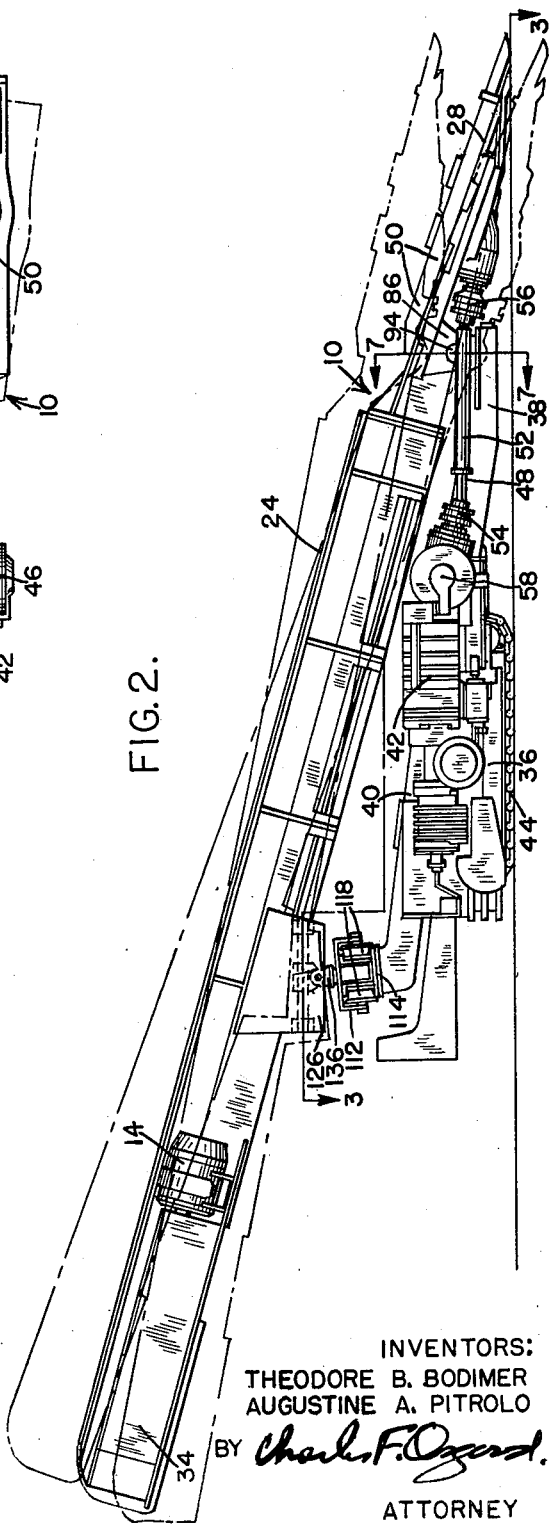
Figure 2 is a side elevation view of the continuous belt loader of Figure 1.

Fluid power cylinders 106 are the means for raising and for positioning endless belt conveyor frame tail 34 through the pivoted positioning of rear structural frame unit 40 and the corresponding height positions of transverse rail guide means 112 throughout a range of positions from the position shown in Figure 2 to the position indicated in the phantom and to such positions as indicated in Figures 8 and 9. Transverse rail guide means 112 is extended transversely to each side of the mobile continuous belt loader 10 sufficiently far to provide rail guide means for rail wheel carriage 126 through the entire range of laterally pivoted positions of loader conveyor frame tail 34. Rail wheel carriage 126 pivots about pivot pin 134 for continuous alignment along one axis with rail guide means 112. Provision for alignment of rail wheel carriage 126 in another plane is provided by pivot pin 138 and in addition sliding of bracket 140 along rod 144 provides longitudinal back and forth movement of the rail wheel carriage 126 with respect to the conveyor frame structure 24. These insure rail wheel carriage 126 alignment with rail guide means 112 for any combination of vertical and lateral pivoted positions of conveyor frame structure 24.

We have herein provided an improved mobile loader with an integral continuous belt conveyor and gathering head structure mounted on a movable base in such a manner as to be adjustable relative to the mobile base through infinite vertical, lateral pivoted and conveyor slope adjustments within the limits established for each. It provides support for an integral belt conveyor and gathering head structure from well forward beneath the front gathering head end. It also provides a continuous belt which extends into the gathering head.

While we have shown and described one embodiment of our invention, various changes and modifications may be effected without departing from the spirit and scope of the invention as defined in the appended claims.

What we claim as new and desire to secure by Letters Patent is:

1. In a mobile loader, a mobile base, conveyor means, a material gathering means at one end of said conveyor means, mounting means provided for mounting said conveyor means to said mobile base and including independently adjustable conveyor-means-supports at the opposite ends of said base, said mounting means constructed to provide for slope adjustment of said conveyor means relative to said base.

2. In the mobile loader defined in claim 1, said mounting means constructed to provide means adjacent said material gathering means for pivotally adjusting said conveyor means whereby the position of the rear end of said conveyor means may be varied.

3. In a mobile loader, a conveyor structure, a material gathering head, said material gathering head integral with the forward end of said conveyor structure, a mobile base, means mounting said conveyor structure on said mobile base including independently adjustable front and rear supports for said conveyor structure to provide slope adjustment for said conveyor structure.

4. In the mobile loader defined in claim 3, said means mounting said conveyor structure including a forwardly extended frame structure providing the front support and pivotably mounted to the forward portion of a mobile base and including a rearwardly extended frame structure providing the rear support and pivotably mounted to said mobile base, said forwardly extended frame structure constructed to provide pivoting means at its forward end for said conveyor structure whereby the lateral position of the discharge end of said conveyor structure may be varied laterally with respect to said frame structure.

5. In the mobile loader defined in claim 4, vertical pivot means with a horizontal pivot axis provided between said lateral pivoting means of the forwardly extended frame structure and said conveyor structure constructed to provide lateral pivoting adjustments of said conveyor structure about the axis of said vertical pivot means, said rearwardly extended frame structure provided with transversely extended rail guide means at the rear, a rail wheel carriage slidably and flexibly mounted to the rearward portion of said conveyor structure constructed for aligned tracking along said rail guide means during lateral pivoting of said conveyor structure, power cylinder means pivotably connected to said mobile base and pivotably connected to said forwardly extended front frame structure constructed to provide controlled pivoting movement of said forwardly extended frame structure about its pivotal mounting on said mobile base and to provide height adjustment of said lateral pivot means and of said conveyor structure and said material gathering head, power cylinder means pivotably connected to said mobile base and pivotably connected to said rearwardly extended frame structure constructed to provide controlled height adjusting pivotal movement of said rearwardly extended frame structure about its pivotal mounting on said mobile base and to provide height adjustment of said rail guide means and through said rail guide means the rail wheel carriage and the tail of said endless belt conveyor structure and by height positioning of the rearward portion of said conveyor with respect to the axis of said horizontal pivot means slope adjustment of said conveyor structure, transversely extended cross plate means connected to said lateral pivot means, power cylinders pivotably connected at each end of said cross plate and pivotably mounted at the other respective ends to the respective sides of said forwardly extended frame structure constructed to provide controlled pivoting of said cross plate and of said conveyor structure about the pivotal axis of said lateral pivoting means.

6. In a mobile loader, a mobile base, conveyor means mounted on said base, material gathering means for moving material onto said conveyor means, means for pivotally mounting said conveyor means for horizontal swinging adjustment relative to said base for varying the discharge position of said conveyor means comprising a forwardly located pivot and a support providing a rearwardly located pivot, and means operatively associated with said support for tilting said conveyor means relative to said base.

7. A mobile loader as set forth in claim 6 wherein said support includes a horizontal transversely extending guideway along which said rearwardly located pivot is guided for horizontal adjustment.

8. A mobile loader as set forth in claim 6 wherein said tilting means comprises a lever pivoted for tilting movement on said base and having pivotal connection with said support and means for tilting said lever.

9. A mobile loader as set forth in claim 7 wherein said support guideway carries a pivot member and a right angle guideway along which said pivot member is guided whereby said angularly related guideways compensate for the arcuate swinging motion of said conveyor means.

10. A mobile loader as set forth in claim 6 wherein said tilting means includes a member adjustable in vertical planes relative to said base and operatively connected to said support.

11. A mobile loader comprising, in combination, a mobile base, conveying means, gathering means for moving material onto said conveying means, a frame overlying said base and on which said conveying means and said gathering means are mounted, means for mounting said frame for horizontal swinging and vertical tilting movements relative to said base, motor means on said base, and self adjusting driving connections between said motor means and said gathering means.

12. A mobile loader comprising, in combination, a mobile base, conveying means mounted on said base, means providing a pivotal connection between the front portion of said conveying means and said base, means providing a rearward pivotal mounting for said conveying means, and means operatively associated with said rearward pivotal mounting means for tilting said conveying means relative to said base.

13. In a mobile loader, a mobile base having propelling means and a frame projecting a substantial distance in advance of said propelling means, conveying means overlying said base, means for pivotally mounting said conveying means on the outer end of said frame to tilt in vertical planes, and means for mounting said frame to tilt in vertical planes relative to said propelling means whereby tilting of said frame effects tilting of said conveying means.

14. A mobile loader as set forth in claim 13 wherein means is provided for pivotally mounting said conveying means on said frame to swing horizontally relative to said tiltable frame.

15. In a mobile loader, a conveyor structure, a material gathering head, said material gathering head integral with the forward end of said conveyor structure, multiple material gathering arms on said material gathering head, a mobile base means mounting said conveyor structure on said mobile base constructed to provide ranges of height, conveyor slope, and lateral pivot positions for said conveyor structure, multiple motor means mounted on said mobile base, multiple traction means on said mobile base in engagement with a ground surface for propelling the loader, a drive train extending from one of said motor means to one of said multiple gathering arms and drive train means extending from the same motor means to the respective traction means.

16. In the mobile loader defined in claim 15, universal joints and variable length splined shafting cooperating to provide flexible drives to the respective material gathering arms adaptable to material gathering head portions throughout the entire range of conveyor structure, slope, height, and lateral pivoted settings.

17. A mobile loader comprising a mobile base, forward and rearward boomlike frames pivotally mounted on said base to tilt relative thereto, said frames extending in opposite directions longitudinally of said base, a frame carrying conveying means and a front gathering head, and means for separately tilting said boomlike frames to tilt said last mentioned frame endwise to vary the elevation of the ends thereof.

18. A mobile loader as set forth in claim 17 wherein said boomlike frames have horizontal pivotal connections with said last mentioned frame near the respective end portions of the latter.

19. A mobile loader as set forth in claim 18 wherein an upright pivotal connection is provided for said last mentioned frame near said horizontal pivotal connection thereof with said forward boomlike frame whereby said last mentioned frame may swing laterally relative to said base.

20. A mobile loader as set forth in claim 19 wherein a transverse guide is carried at the outer end of said rearward boomlike frame for guiding the rearward portion of said last mentioned frame during such lateral swinging thereof about said upright pivotal connection.

References Cited in the file of this patent
UNITED STATES PATENTS 1,467,700  Wilson ---------------- Sept. 11, 1923